(12) United States Patent
Gautier

(10) Patent No.: US 12,404,050 B2
(45) Date of Patent: Sep. 2, 2025

(54) DEVICE FOR LAUNCHING A DRONE USING SPRING THRUST, METHOD FOR LAUNCHING DRONES USING THIS DEVICE, AND TOOL FOR IMPLEMENTING THIS METHOD

(71) Applicant: KNDS FRANCE, Versailles (FR)

(72) Inventor: Pierre Gautier, Bourges (FR)

(73) Assignee: KNDS FRANCE, Versailles (FR)

(*) Notice: Subject to any disclaimer, the term of this patent is extended or adjusted under 35 U.S.C. 154(b) by 0 days.

(21) Appl. No.: 18/841,793

(22) PCT Filed: Jan. 9, 2023

(86) PCT No.: PCT/IB2023/050148
§ 371 (c)(1),
(2) Date: Aug. 27, 2024

(87) PCT Pub. No.: WO2023/161729
PCT Pub. Date: Aug. 31, 2023

(65) Prior Publication Data
US 2025/0162738 A1    May 22, 2025

(30) Foreign Application Priority Data
Feb. 28, 2022  (FR) ........................... 2201679

(51) Int. Cl.
*B64U 70/70*    (2023.01)

(52) U.S. Cl.
CPC ................... *B64U 70/70* (2023.01)

(58) Field of Classification Search
CPC . B64U 70/70; B64U 70/50; B64F 1/04; B64F 1/06
(Continued)

(56) References Cited

U.S. PATENT DOCUMENTS 5,599,302 A * 2/1997 Lilley ............... F41B 11/81
604/500
10,151,555 B1  12/2018 Matson et al.
(Continued)

FOREIGN PATENT DOCUMENTS

| CN | 103091069 A | 5/2013 |
|---|---|---|
| CN | 111572801 B | 8/2021 |
| EP | 3 736 523 A1 | 11/2020 |

OTHER PUBLICATIONS

Apr. 3, 2023 International Search Report issued in International Patent Application No. PCT/IB2023/050148.
(Continued)

*Primary Examiner* — Arfan Y. Sinaki
(74) *Attorney, Agent, or Firm* — Oliff PLC

(57) ABSTRACT

A device for launching a drone using spring thrust, in which the means that control the unlocking of an ejection assembly from its armed position include a release housing containing a release chamber, at least one release element which, with the housing, delimits the chamber and is able to move, under the action of the pressure of a gas introduced into the chamber, from a position of rest to a release position in which the at least one release element unlocks the ejection assembly, and return means for returning the at least one release element to the position of rest. The invention also relates to a method for launching drones using the device and to a tool for implementing this method.

12 Claims, 4 Drawing Sheets

(58) Field of Classification Search
USPC .......................................................... 244/63
See application file for complete search history.

(56) References Cited

U.S. PATENT DOCUMENTS 11,987,326 B2 * 5/2024 Pernechele .............. B64D 7/00
2020/0355465 A1 11/2020 Gernert et al.

OTHER PUBLICATIONS

Sep. 16, 2022 Search Report and Written Opinion issued in French Patent Application No. 2201679.

* cited by examiner

DEVICE FOR LAUNCHING A DRONE USING SPRING THRUST, METHOD FOR LAUNCHING DRONES USING THIS DEVICE, AND TOOL FOR IMPLEMENTING THIS METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

BACKGROUND OF THE INVENTION

Field of the Invention

The technical field of the invention is that devices for launching drones, and more specifically, that of devices for launching drones using spring thrust.

Drones, or remotely piloted aircrafts, can carry a payload for civil or military surveillance, intelligence, combat or transport missions. As small flying machines that are cheaper and simpler to operate than aircraft with pilots, drones are enjoying a boom.

Description of Related Art Including Information Disclosed Under 37 CFR 1.97 and 1.98

A number of devices for launching drones are known, including launch devices with launch tube.

The aim of these devices with launch tube is to propel the drone a few metres above the vehicle carrying the launch tube, for deployment of the drone. This avoids any contact between the drone and the antennae mounted on the vehicle and allows rapid deployment.

There are many types of launch devices with launch tube, including the spring thrust-type device in which a compression spring bears against the rear end of a launch tube and presses against an ejection element slidably mounted in the launch tube and against which the drone will be placed. The device is armed by compressing the compression spring and then locking the ejection element in position, the device then being in the armed position. Unlocking is controlled by a release mechanism, which causes the release of the spring and the launching of the drone, pushed by the ejection element.

This type of launch device is disclosed in Chinese patent application CN111572801 A, in which the release mechanism is a rotary mechanism driven in rotation by a motor. Similarly, the compression of the spring, after the drone has been launched, is implemented by a motor integrated into the device and located in the launch tube.

However, the use of such motorised means increases the cost and weight of the launch device, and does not make it possible to achieve optimum compactness, particularly as it limits the volume that can accommodate a drone in the launch tube.

BRIEF SUMMARY OF THE INVENTION

It is therefore the aim of the invention to provide a launch device that does not have these disadvantages.

The solution according to the present invention is based on the use of a release mechanism comprising at least one release element whose displacement leads to the unlocking of the ejection element and is obtained by the action of a gas pressure in a release chamber, which makes it possible to reduce the cost and weight of the device, and on the use of a separate tool, not integrated into the launch tube, to return the device to the armed position, which makes it possible to increase the volume available for the drone in the launch tube.

The present invention therefore relates to a device for launching a drone using spring thrust, the device comprising a longitudinal launch tube having a first rear end, which is closed, and a second front end, which is open, and the inside of which defines a launch chamber intended to receive a drone, and means for ejecting the drone from the launch tube which comprise:

an ejection assembly comprising an ejection element, mounted so as to slide longitudinally in the launch chamber and intended to push the drone in order to eject it from the launch tube, and a compression spring, referred to as an ejection spring, having a longitudinal axis coaxial with the longitudinal axis of the launch tube and a first end of which bears on the rear end of the launch tube and a second end of which bears against the ejection element, the ejection assembly being able to be placed in an armed position, in which the ejection spring is compressed by the ejection element, locking means for releasably locking the ejection assembly in the armed position, the locking means comprising at least one retaining element connected to the launch tube and movable between a locking position, in which the at least one retaining element is engaged with the ejection element so as to hold the ejection assembly in the armed position, against the action of the ejection spring, and an unlocking position, in which the at least one retaining element is disengaged from the ejection element, and control means for controlling unlocking of the ejection assembly, by moving the at least one retaining element from the locking position to the unlocking position, characterized in that the control means comprise:

a release housing, located at the rear of the launch tube and containing a release chamber able to be connected to a gas pressure source, at least one release element which, together with the release housing, delimits the release chamber and is movable, under the action of a gas pressure introduced into the release chamber, from a rest position in which the at least one release element allows the at least one retaining element to remain in the locking position, to a release position, in which the at least one release element moved the at least one retaining element from the locking position to the unlocking position, and means for returning the at least one release element to the rest position.

Said return means may be elastic means, such as a spring.

Preferably, the control means are configured so that the at least one release element moves the at least one retaining element from the locking position to the unlocking position by translational movement of the at least one release element. According to a particular embodiment, the release housing is formed as a hollow cylinder that is integral with the launch tube and has a longitudinal axis, and the release element is a release piston mounted in the release housing so as to slide along said longitudinal axis, the release chamber being cylindrical in shape and delimited radially by the release housing and axially on one side by the release housing and on the other side by the release piston.

However, the present invention is not limited to the way in which the at least one release element moves.

A release element could thus be provided, which is mounted so as to be rotatable relative to the release housing, about the longitudinal axis of the release housing. Such a release element could, for example, comprise a vane-forming part received in the release housing and forming a wall of the release chamber, so that the entry of gas into the release chamber causes the release element to rotate. The return means may, for example, consist in a torsion spring extending around a vertical bearing on which the release element is rotatably mounted, and one arm of which is fixed and the other arm of which is integral with said vane-forming part. Stops may be carried by the release housing so as to define said rest position and an end-of-travel position for the release element. The at least one retaining element will be configured to be moved from the locking position to the unlocking position by rotation of the release element. For example, each retaining member is pivotally mounted in a manner similar to the embodiment to be described below, and the release element will include, extending out of the release housing, for each retaining member, a cam-like member dimensioned to push on the respective retaining element when the release element is rotated.

To further improve the compactness of the ejection means, advantageously the release housing is surrounded by the ejection spring, the at least retaining element is connected to the release housing and is located in the interior space of the ejection spring, and the ejection element comprises a thrust head that is perpendicular to the longitudinal axis of the launch tube and against which the second end of the ejection spring bears, and at least one holding member that is integral with the thrust head and extends into the interior space of the ejection spring, the at least one retaining element being configured to hold the ejection assembly in the armed position by gripping the at least one holding member in the locking position.

Thus, according to a particular advantageous embodiment of the ejection assembly, in which the release element is a release piston movable in translation, the release housing has a first rear axial side, which is closed, and a second front axial side, which is open and on which is removably mounted a plug comprising a through bore that is coaxial with the longitudinal axis of the launch tube, the release chamber being delimited axially by said first axial side of the release housing and by a first axial side, closed, of the release piston, which is formed as a hollow cylinder, the second front axial side of which is open and formed by an annular end, and the cylindrical wall of which, which defines an interior space, slides against the cylindrical wall of the release housing between the rest position, in which the release piston abuts by its first axial side against a shoulder of the release housing, and the release position, in which the release piston abuts against an axial stop carried by the plug, the at least one retaining element being carried by the plug and, in the armed position, the at least one holding member extending into the release housing through the through bore of the plug so that it can be gripped by the at least one retaining element in the locking position, the at least one retaining element being configured to be located, in the locking position, on the path followed by the annular end of the release piston during its movement from the rest position to the release position, so as to be moved from the locking position to the unlocking position by the annular end of the release piston pushing against the at least one retaining element.

Preferably, the device comprises a plate which is located in the interior space defined by the cylindrical wall of the release piston and is fixed to the plug, and at a distance therefrom, by spacers, the plate thus having a first face facing the first axial side of the release piston and a second opposite face on the side of which the at least one retaining element is located, the axial stop being carried by the first face of the plate and the means for returning the release piston to the rest position being elastic return means, such as a compression spring, bearing on the first face of the plate and pressing against the first axial side of the release piston.

The present invention is also not limited to the way in which the at least one retaining element moves between the locking position and the unlocking position. It could also be contemplated that each retaining element moves in translation.

Preferably, the at least one retaining element is movable between the locking position and the unlocking position by pivoting.

Preferably, the device comprises two retaining elements each pivotally mounted about a respective pivot pin which is integral with said plug, each pivot pin belongs to a plane perpendicular to the longitudinal axis of the launch tube and is perpendicular to a longitudinal plane of the launch tube, the device further comprising means for elastically returning the retaining elements to the locking position.

The holding member can take the form of a rod provided with a circumferential groove able to receive one end of each at least one retaining element in the locking position.

The present invention also relates to a method for launching drones using a launch device using spring thrust as defined above, characterized in that it comprises the following successive steps:

a positioning step, comprising positioning a drone in the launch chamber, the ejection assembly being locked in the armed position;

a step of launching the drone, comprising introducing into the release chamber sufficient gas pressure to move the release element from the rest position to the release position, whereby the ejection assembly is unlocked and ejects the drone from the launch tube; and before the positioning step is repeated, a repositioning step, comprising returning the ejection assembly to the armed position, in which it is locked by the at least one retaining element.

The present invention also relates to a tool for implementing the method as defined above, characterized in that it comprises a carriage movable in translation along at least one frame which has, at one end, a drive plate, the carriage and the frame being able to be introduced into the launch chamber, after the launching step, such that the carriage bears against the ejection element and the drive plate bears against the open end of the launch tube, translation driving means being provided for driving the carriage in translation along the frame, by means of which the carriage is movable towards the rear end of the launch tube so as to compress the ejection spring and return the ejection assembly to the armed position.

Preferably, the frame also comprises a bottom plate able, in use, to bear against the rear end of the launch tube, and at least one guide rod connecting the bottom plate and the drive plate and along which the carriage is mounted movable in translation, the translation driving means comprise a worm screw and means for driving the worm screw in rotation, the worm screw extending between the bottom plate and the drive plate, to which it is connected so as to be rotatable about its longitudinal axis, and passing through a threaded hole of the carriage, whereby rotation of the worm screw results in translation of the carriage.

The means for driving in rotation can be manual or motorised.

The means for driving in rotation may comprise a gear set mounted in the drive plate and connected to a drive shaft accessible from outside, for manual drive, for example by a crank, or motorised drive, for example using a drill.

BRIEF DESCRIPTION OF THE SEVERAL VIEWS OF THE DRAWINGS

To better illustrate the subject-matter of the present invention, a particular embodiment will be described below, with reference to the attached drawings. In these drawings.

DETAILED DESCRIPTION OF THE INVENTION

Figures 1, 2:
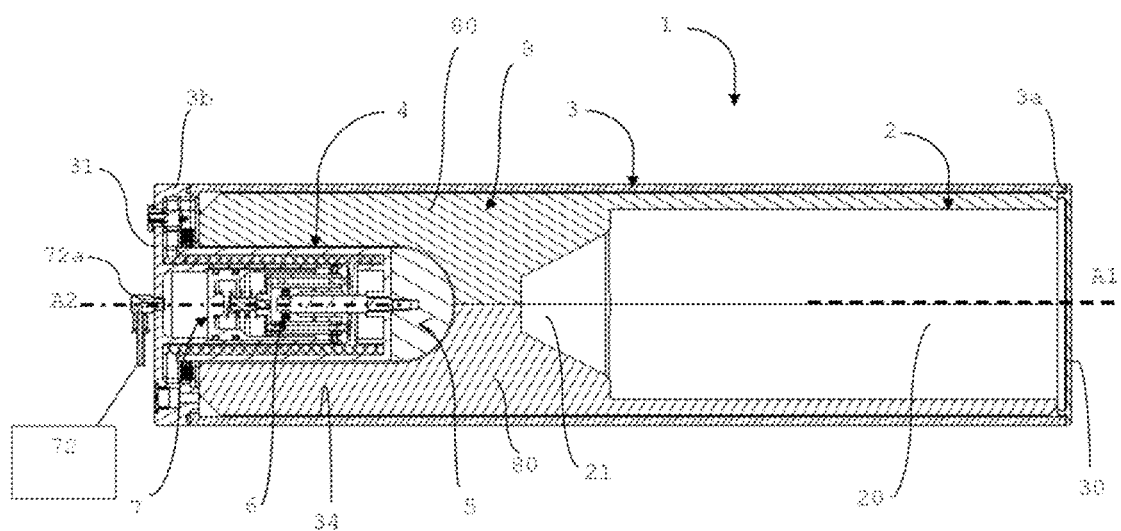
FIG. 1 is a side view, in longitudinal section, of the launch device according to the particular embodiment of the present invention, in the armed position.
FIG. 2 is a side view, in longitudinal section, showing more specifically the ejection means of the device in FIG. 1, in a sectional plane perpendicular to the sectional plane in FIG. 1.
Figure 3:
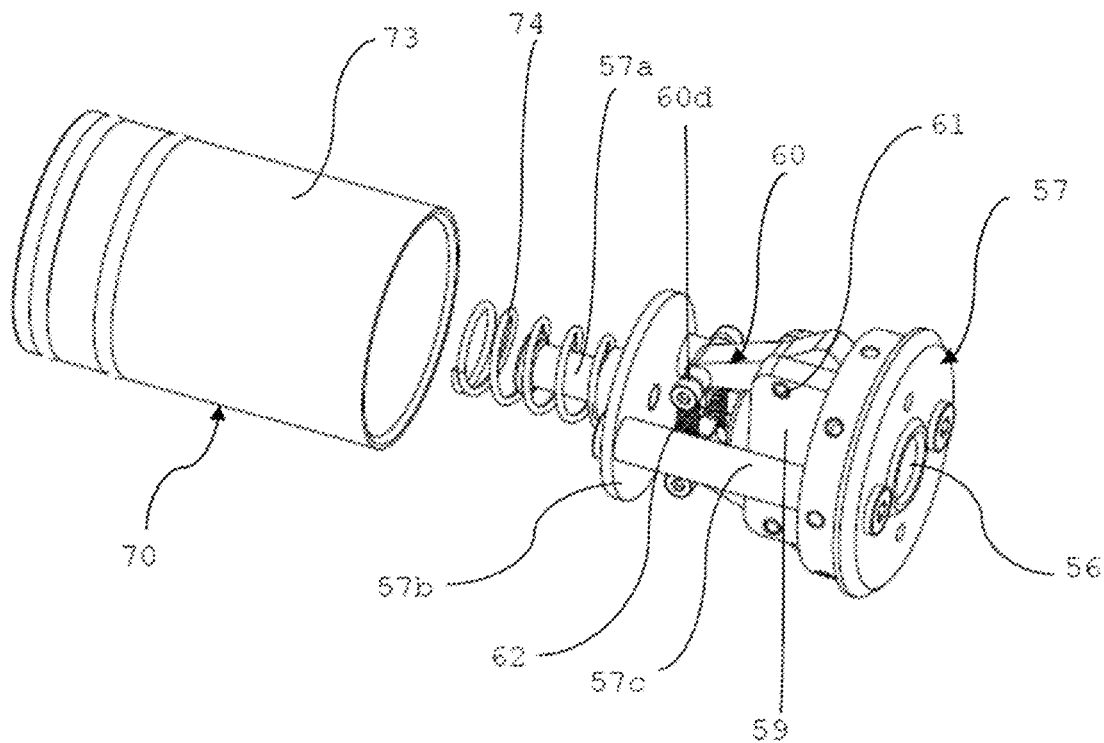
FIG. 3 is a perspective view of the locking means for locking in the armed position.
Figure 4:
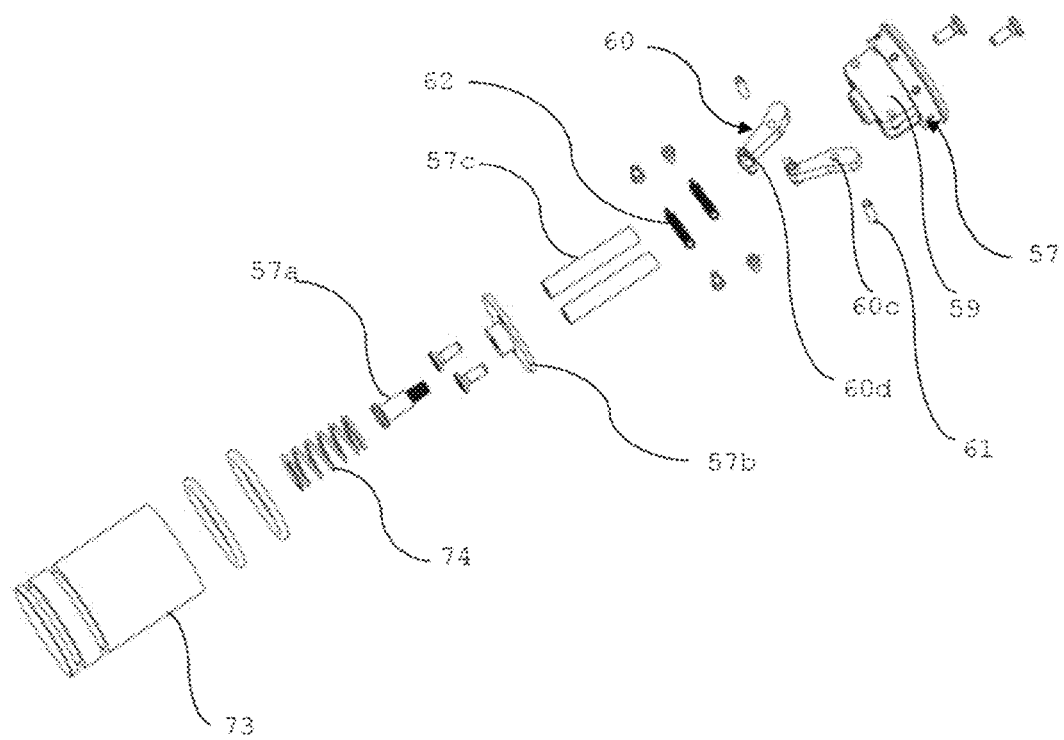
FIG. 4 is an exploded perspective view of the locking means in FIG. 3.

Referring first of all to FIG. 1, it can be seen that the launch device 1 according to the present invention is intended for launching a drone-type object 2.

Such a drone 2 typically comprises a base body 20 containing a power plant, a battery pack and navigation electronics. The drone 2 is equipped with a payload 21 removably mounted on the base body 20. This payload 21 may be a lethal or non-lethal load. For example, the drone 2 could be equipped with an explosive-type lethal load, a non-lethal load enabling paint or smoke to be released, or an optronic load enabling observation and detection.

Referring now to FIGS. 1 to 4, it can be seen that the device 1 comprises a launch tube 3 with a longitudinal axis A1, intended to receive the object to be launched, i.e. the drone 2, before it is launched, and ejection means 4 for ejecting the drone 2.

The launch tube 3 has a generally cylindrical shape about its longitudinal axis A1, and it has a front end 3*a* forming the mouth for the exit of the drone 2 and a rear end 3*b* in the region of which the ejection means 4 are arranged.

It is emphasized here that the terms "front" and "rear" refer to the predetermined direction of movement of the drone 2 relative to the launch tube 3 during launch.

The front end 3*a* is closed, prior to launch, by a circular tight plug 30, the diameter of which corresponds to the exterior diameter of the launch tube 3.

The rear end 3*b* is closed by a base 31 in the form of a block of circular section, the diameter of which corresponds to the external diameter of the launch tube 3. The base 31 is fixed to an interior shoulder 32 of the launch tube 3, which is annular in shape, by fasteners 33, such as screws, passing through orifices provided in the base 31 and orifices provided in the interior shoulder 32 and located opposite each other.

The launch tube 3 defines therein a cylindrical launch chamber 34 having, in the region of the rear end 3*b*, a seat 35, here formed by the interior shoulder 32, against which the drone 2 will be placed before ejection from the launch tube 3 by the ejection means 4.

The ejection means 4 comprise an ejection assembly 5 able to be placed in an armed position, locking means 6 for releasably locking the ejection assembly 5 in the armed position, and control means 7 for controlling the unlocking of the ejection assembly 5.

As it can be seen in FIGS. 1 and 2, the ejection assembly 5 comprises an ejection element 50 and an ejection spring 51 which consists of a compression spring.

In this particular embodiment, the ejection element 50 is formed as an ejection piston 52 having a piston body 53, a thrust head 54 and a holding rod 55.

The piston body 53 is a hollow cylindrical body having a first axial side 53*a*, directed towards the rear end 3*b* of the launch tube 3, which is open, and a second axial side, directed towards the front end 3*a* of the launch tube 3, which is closed by a circular transverse wall 53*b* having, at its centre, an orifice. An annular central projection 53*c* surrounding the orifice extends inside the ejection piston 52, from the transverse wall 53*b*. The transverse wall 53*b* also carries an annular exterior projection 53*d* arranged and dimensioned so that the ejection spring 51 is received between the exterior projection 53*d* and the internal side wall of the piston body 53.

The thrust head 54 is a hemispherical body integral with the transverse wall 53*b*, on the exterior side of the piston body 53. The diameter of the base of this hemispherical body is equal to the exterior diameter of the piston body 53. The thrust head 54 has, at its centre, an orifice 54*a* located opposite the orifice of the transverse wall 53*b* and dimensioned to receive and lock the holding rod 55, which is thus made integral with the ejection piston 52.

The holding rod 55 extends along a longitudinal axis A2 coaxial with the longitudinal axis A1 and slidably extends into a cylindrical bore 56 formed in a plug 57.

This plug 57 extends transversely to the launch chamber 35, inside the piston body 53. The plug 57 is fixed with respect to the launch tube 3. In particular, the plug 57 is fixed, with radial screws 58, to an open front side of a tubular housing 37, or case, extending from the base 31.

The housing 37 extends perpendicularly from the transverse wall of the base 31, in other words parallel to said longitudinal axis A1, towards the front end 3*a* of the launch tube 3. Preferably, the housing 37 and the base 31 are one piece.

The housing 37 is dimensioned so that it is contained within the piston body 53 in the armed position of the ejection assembly 5.

The holding rod 55 has, at its free end region, opposite its end region connected to the piston body 53, a groove 55*a* intended to receive the locking means 6 in the locking position. The groove 55*a* is formed over the entire circumference of the holding rod 55.

The ejection spring 51 is located in the space formed between the exterior wall of the housing 37 and the interior wall of the piston body 53, between the rear end 3*b* of the launch tube 3 and the transverse wall 53*b* of the piston body 53. More specifically, the ejection spring 51 has a first end bearing on the transverse wall of the base 31 and a second end bearing against the transverse wall 53*b*, made integral with them for example by any suitable means.

The locking means 6 keep the ejection spring 51 in the compressed state and therefore prevent the ejection piston 52 from sliding towards the front end of the launch tube 3, thereby keeping the ejection assembly 5 in the armed position.

In the particular embodiment shown in FIGS. 1 to 4, the locking means 6 comprise two retaining elements 60.

Each retaining element 60 is rotatably mounted about a pivot pin 61 integral with the plug 57. The two pivot pins 61 are parallel to each other. Each pivot pin 61 is integral with two facing plates 59 extending perpendicularly from the transverse wall of the plug 57. The pivot pins 61 are therefore orthogonal to the longitudinal axis A1.

Each retaining element 60 is formed as a finger having a bent section 60*a* and a nose section 60*b*. The pivot pin 61 is received in a through hole 60*c* formed at the corner of the bent section 60*a*. The free end of the bent section 60*a* has a rounded profile. The nose section 60*b* has a substantially V-shaped profile, Each retaining element 60 is dimensioned and arranged such that the free end of the nose section 60*b* is able to be received in the groove 55*a* of the holding rod 55, and the free end region of the bent section 60*a* is able to come into contact with the interior wall of the housing 37.

The two retaining elements 60 are arranged in the same plane passing through the longitudinal axis A1 and perpendicular to the transverse wall of the plug 57, the free ends of their nose section 60*b* being directed towards each other. Two return springs 62 extend between the two retaining elements 60. In particular, two pins 60*d* extend on either side of each retaining element 60 at the corner of the nose section 60*b* and parallel to the pivot pins 61. A return spring 62 is mounted between each facing pin 60*d*. These return springs 62 tend to return the nose sections 60*b* of the retaining elements 60 towards the groove 55*a* of the holding rod 55, thus urging the retaining elements 60 towards their locking position.

The control means 7 are intended to control the movement of the retaining elements 60 to their unlocking position, against the return springs 62, by the action of a gas pressure.

The control means 7 comprise a release element 70 and a release chamber 71 able to be connected to a gas pressure source 72.

The release element 70 is formed as a release piston 73 slidably mounted in the housing 37. As it can be seen in FIGS. 3 and 4, the release piston 73 is a hollow cylindrical body having a first axial side, directed towards the rear end 3*b* of the launch tube 3, which is closed by a circular transverse wall 73*a*, and a second axial side, directed towards the front end 3*a* of the launch tube 3, which is open and formed by an annular end 73*c*.

The housing 37 has a shoulder 37*a* which defines a first axial stop for the release piston 73, against which the transverse wall 73*a* is in contact when the release piston 73 is in the rest position.

At its centre, the transverse wall 73*a* has a projecting tubular part forming a counter-stop 73*c* able to come into contact with an axial stop 57*a* integral with the plug 57 in order to limit the travel of the release piston 73, i.e. its sliding towards the front end of the housing 37. The axial stop 57*a* is integral with a transverse circular plate 57*b* which is in turn integral, via two spacers 57*c*, with the transverse wall of the plug 57. The two spacers 57*c* extend on the outside of the plates 59 carrying the pivot pins 61 of the retaining elements 60 and their length is such that the retaining elements 60 cannot come into contact with the plate 57*b*.

A compression spring 74 extends around the axial stop 57*a* and the counter-stop 73*c*, between the plate 57*b* and the transverse wall 73*a* of the release piston 73. This spring 74 is intended to urge the release piston 73 towards the rear end 3*b* of the launch tube 3, in other words away from the axial stop 57*a*. Thus, once the release chamber 71 is no longer pressurized, the release piston 73 is automatically returned to its rest position, i.e. to a position in which the release piston 73 is not in contact with the retaining elements 60.

The release chamber 71 is radially delimited by the interior wall of the housing 37. The release chamber 71 has a rear end closed by the transverse wall of the base 31 and a front end delimited by the transverse wall 73*a* of the release piston 73. The base 31 has an inlet orifice opening into the release chamber 71 and is intended to be connected to a gas pressure source 72 by a pneumatic connector 72*a*.

The gas pressure source 72 is intended to enable the release chamber 71 to be pressurized by compressed gas, which may be air. The pressure source 72 can be any gas pressure source. For reasons of space, the pressure source 72 is an external pressure source, i.e. it is arranged outside the launch tube 3 and is able to be brought into communication with the release chamber 71 via the pneumatic connector 72*a*.

Referring again to FIG. 1, it can be seen that the device 1 also includes a launch sabot 8 intended to receive the drone 2.

The launch sabot 8 is dimensioned and configured to be received in the launch chamber 34 to enable the drone 2 to be guided in the launch tube 3 during the launch phase, and to surround the drone 2 to enable the drone 2 to be protected during launch. It should be noted that a different sabot 8 is defined according to the profile of the drone 2 and its payload 21.

In the particular embodiment shown, the sabot 8 is formed of several separable segments 80, for example four identical segments 80. These segments 80 delimit between them a space for receiving the drone 2 having an opening intended to be located opposite the front end 3*a* of the launch tube 3. These segments 80 also delimit between them a space for receiving the ejection means 4, having an opening intended to allow the passage of the ejection means 4 when the sabot 8 is introduced into the launch chamber 34.

Alternatively, the sabot can be formed of four separable segments, three of which are identical and one of which contains a charging and communication device between the drone and the launch tube. As the sabot is designed to be ejected from the launch tube and to disengage from the drone after launch, the charging and communication device is a wireless device. Preferably, this device is of inductive type and a transmission coil B (FIG. 2) is integral with the base 31 and able to cooperate, via said device, with a receiver coil housed in the drone.

The launch device 1 according to the present invention enables drones 2 to be launched easily, quickly and reliably, the launching method comprising a pre-launch phase, a launch phase and a post-launch phase.

During the pre-launch phase, the launch sabot 8, in the reception space of which the drone 2 is received, is first inserted through the open front end 3a of the launch tube 3, until it comes into contact with the seat 35, then the front end 3a of the launch tube 3 is closed by the tight plug 30.

During this phase, the ejection means 4 are placed in the space of the sabot 8 for receiving the ejection means. In particular, the ejection assembly 5 is in the armed position, the ejection spring 51 being compressed, the retaining elements 60 being in the locking position and the release piston 73 being not in contact with the retaining elements 60.

When it is desired to launch the drone 2, during the launch phase, the release chamber 71 should simply be pressurized. The pressure contained in the release chamber 71 will then push the release piston 73 towards the retaining elements 60, until the counter-stop 73c of the release piston 73 abuts against the axial stop 57a. During this sliding movement, the annular end 73b of the release piston 73 comes into contact with the rounded profile end of the retaining elements 60 and pushes them inwards, causing the retaining elements 60 to rotate in a direction tending to move the nose sections 60b away from the groove 54a. Once the retaining elements 60 are disengaged from the holding rod 55, i.e. in the unlocking position, the holding rod 55 is released and the ejection piston 52 is free to slide and no longer holds the ejection spring 51 in the compressed state. The ejection spring 51 is therefore released instantaneously and its extension causes the ejection piston 52 to slide suddenly towards the front end 3a of the launch tube 3. In this position, the thrust head 53 applies a thrust force against the sabot 8, thus ejecting the sabot 8 and the drone 2 contained therein from the launch tube 3.

Once ejected from the launch tube 3, the sabot 8 disengages itself into separate segments 80. Once at its apogee, the drone 2 starts up and stabilizes and its mission can begin.

Figure 7:
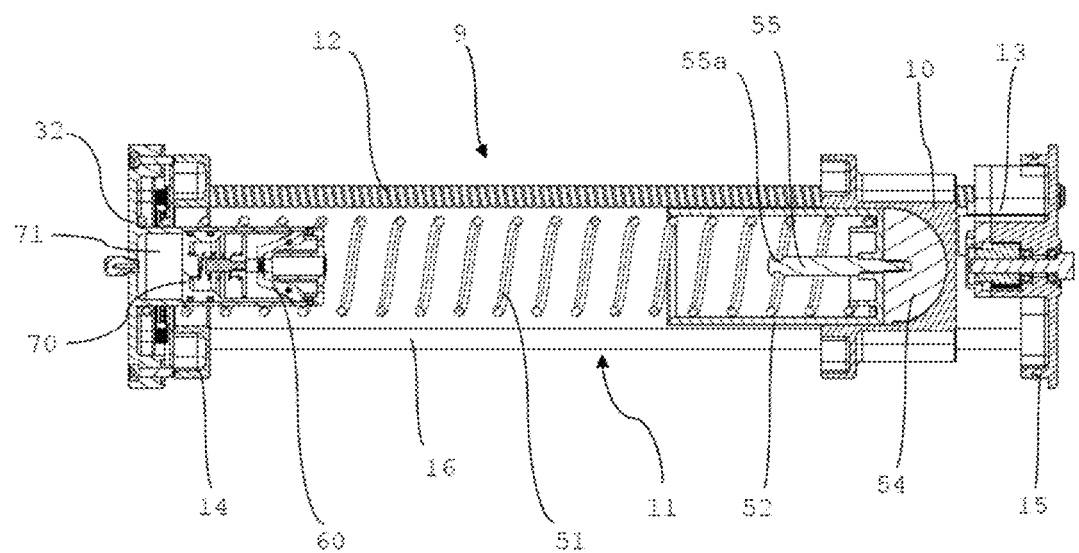
FIG. 7 is a side view, in longitudinal section, of the tool and the launch device in the same position as shown in FIG. 6.

As it can be seen in FIG. 7, when the sabot 8 and the drone 2 are ejected from the launch tube 3, the ejection piston 50 is close to the front end 3a of the launch tube 3, with the ejection spring 51 in its fully extended state. Following the exhausting of the release chamber 71, the release piston 73 was returned to the rest position by the spring 73, allowing the return springs 62 to pivot the retaining elements 60 inwards.

During the post-launch phase, the launch device 1 is prepared for the launch of another drone 2, in other words, the ejection assembly 5 is repositioned to its armed position, during which the ejection spring 51 is compressed again.

Figure 5:
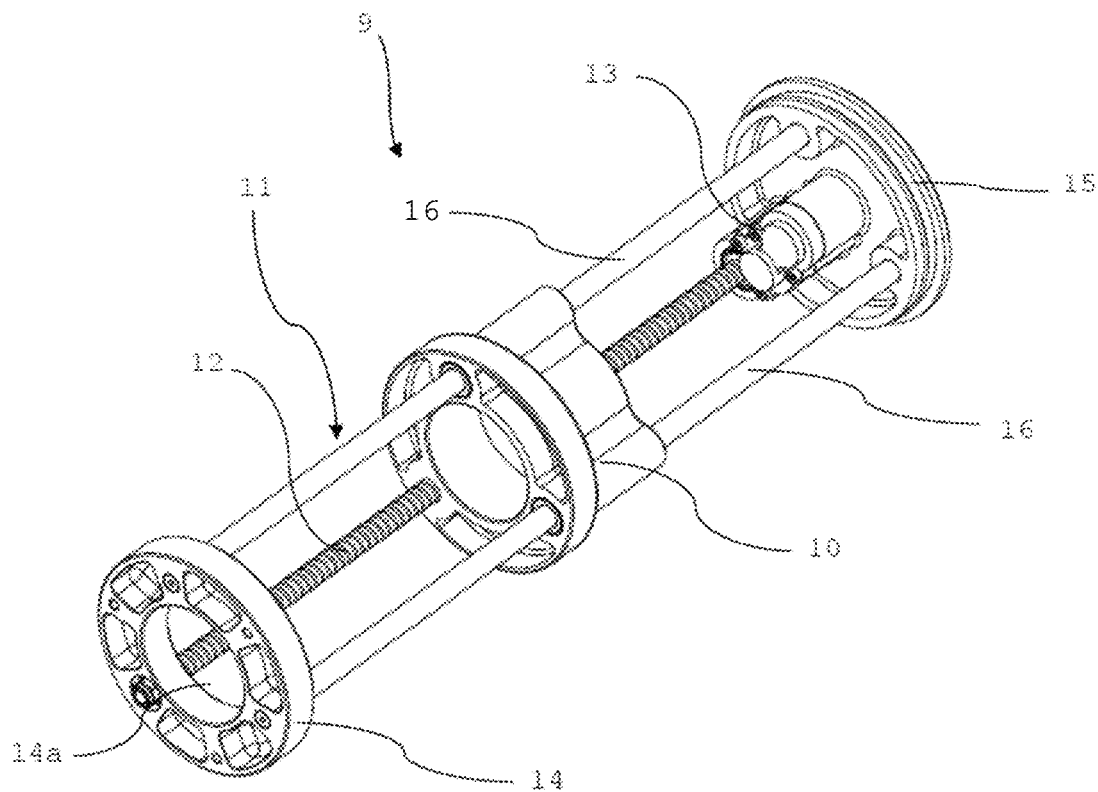
FIG. 5 is a perspective view of the tool according to the particular embodiment of the present invention.
Figure 6:
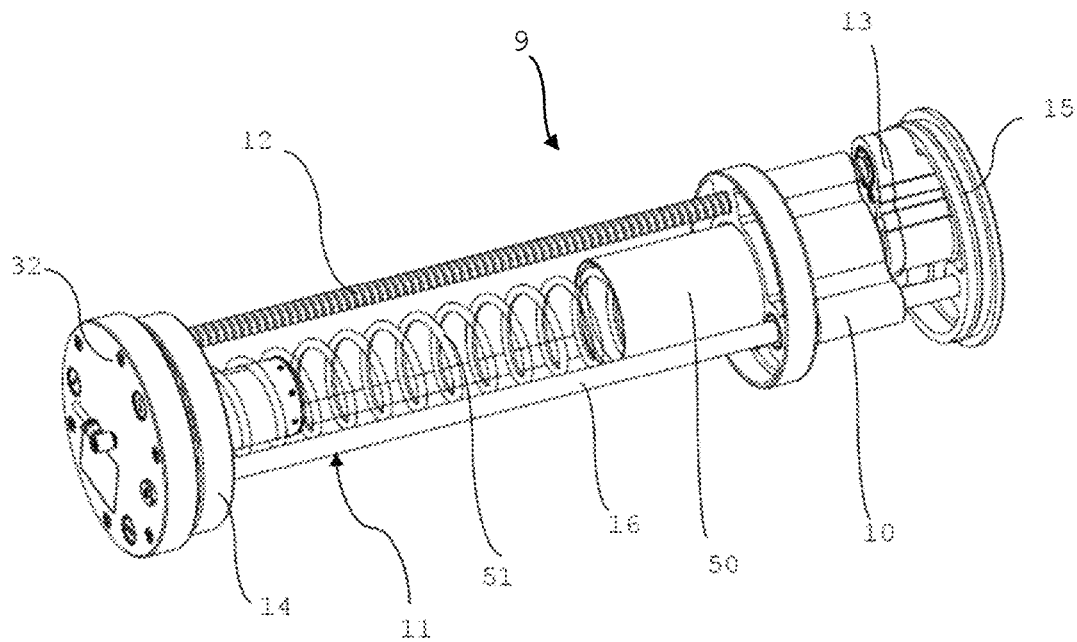
FIG. 6 is a perspective view of the tool in FIG. 5, mounted in the launch chamber of the device according to the invention, with the launch tube omitted.

This phase is carried out by the tool 9 according to a particular embodiment of the present invention, shown in FIGS. 5 to 7.

As it can be seen in FIG. 5, the tool 9 comprises a carriage 10 and a frame 11 along which the carriage 10 is movable in translation by translation driving means.

The translation driving means comprise a worm screw 12 and a gear set 13.

The worm screw 12 is mounted between a bottom plate 14 and a drive plate 15, which are connected by two guide rods 16 that form part of the frame 11.

The bottom plate 14 is a circular plate the external diameter of which is smaller than the internal diameter of the launch tube 3. The bottom plate 14 has a central cylindrical bore 14a, the diameter of which is greater than the exterior diameter of the ejection piston 52.

The drive plate 15 is also a circular plate able to fit over the open front end 3a of the launch tube 3, and has therefore the same size as the tight plug 30.

The drive plate 15 incorporates the gear set 13, one gear of which engages with the thread of the worm screw 12, so that the worm screw 12 can be rotated by controlling the gear set 13.

The carriage 10 is traversed by the two guide rods 16, passing through two bores of the carriage 10, and by the worm screw 12, passing through a threaded hole, so that a rotation of the worm screw 12 causes the carriage 10 to move in translation along the guide rods 16.

The carriage 10 has an exterior diameter equal to the diameter of the bottom plate 14. The carriage 10 has a receiving part, able to receive and enclose the thrust head 54 and the front end region of the piston body 53.

In practice, as it can be seen in FIG. 7, during the post-launch phase, the tool 9 is positioned in the launch tube 3. More specifically, the bottom plate 14 is positioned against the seat 35, with its bore 14a surrounding the ejection spring 51, the drive plate 15 is positioned at the front end 3a of the launch tube 3 and the carriage 10 covers the thrust head 54. The gear set 13 is activated, either manually or by motor, to rotate the worm screw 12. The carriage 10 is then moved in translation towards the rear end 3b of the launch tube 3. As the carriage 10 covers the thrust head 54, the movement of the carriage 10 causes the thrust head 54 and therefore the holding rod 55 to move progressively towards the rear end 3b, thereby compressing the ejection spring 51. When the holding rod 55 comes into contact with the retaining elements 60, the holding rod 55 first rotates them against the return springs 62, then the retaining elements 60 automatically engage in the groove 55a as soon as the nose sections 60b are facing it. The ejection spring 51 is then placed in its compressed state and the ejection assembly 5 is in its armed position, ready for a new launch phase.

The tool 9 is removed from the launch tube 3 and a new sabot 8 can then be positioned in the launch chamber 35, and the previous phases are repeated for the launch of this drone 2 and other drones.

It is understood that the particular embodiment described above is indicative and non-limiting, and that modifications may be made without departing from the scope of the present invention.

The invention claimed is:

1. A device for launching a drone using spring thrust, the device comprising:
   a longitudinal launch tube having a first rear end, which is closed, and a second front end, which is open, and the inside of the launch tube defining a launch chamber intended to receive the drone, and
   ejection means for ejecting the drone from the launch tube which the ejection means comprising:
      an ejection assembly comprising an ejection element, mounted so as to slide longitudinally in the launch chamber and intended to push the drone in order to eject the drone from the launch tube, and an ejection spring having a longitudinal axis coaxial with a longitudinal axis of the launch tube, wherein a first end of the ejection spring bears on the rear end of the launch tube and a second end of the ejection spring bears against the ejection element, the ejection assembly being able to be placed in an armed position, in which the ejection spring is compressed by the ejection element, locking means for releasably locking the ejection assembly in the armed position, the locking means comprising at least one retaining element connected to the launch tube and movable between a locking position, in which the at least one retaining element is engaged with the ejection element so as to hold the ejection assembly in the armed position, against the action of the ejection spring, and an unlocking position, in which the at least one retaining element is disengaged from the ejection element, and control means for controlling unlocking of the ejection assembly, by moving the at least one retaining element from the locking position to the unlocking position, wherein the control means comprise:
    a release housing, located at a rear of the launch tube and containing a release chamber able to be connected to a gas pressure source,
    at least one release element which, together with the release housing, delimits the release chamber and is movable, under the action of a gas pressure introduced into the release chamber, from a rest position in which the at least one release element allows the at least one retaining element to remain in the locking position, to a release position, in which the at least one release element moves the at least one retaining element from the locking position to the unlocking position, and means for returning the at least one release element to the rest position.

2. The device according to claim 1, wherein the release housing is formed as a hollow cylinder that is integral with the launch tube and has a longitudinal axis, and the release element is a release piston mounted in the release housing so as to slide along the longitudinal axis of the release housing, the release chamber being cylindrical in shape and delimited radially by the release housing and the release chamber being delimited axially one side by the release housing and another side by the release piston.

3. The device according to claim 2, wherein the release housing is surrounded by the ejection spring, the at least one retaining element is connected to the release housing and is located in an interior space of the ejection spring, and the ejection element comprises a thrust head that is perpendicular to the longitudinal axis of the launch tube and the second end of the ejection spring bears against the thrust head, and at least one holding member that is integral with the thrust head and extends into the interior space of the ejection spring, the at least one retaining element being configured to hold the ejection assembly in the armed position by gripping the at least one holding member in the locking position.

4. The device according to claim 3, wherein the release housing has a first rear axial side, which is closed, and a second front axial side, which is open and on which is removably mounted a plug, the plug comprising a through bore that is coaxial with the longitudinal axis of the launch tube, the release chamber being delimited axially by the first axial side of the release housing and by a first axial side of the release piston, the first axial side of the release piston being closed, the release piston being formed as a hollow cylinder, wherein a second front axial side of the release piston is open and formed by an annular end, and a cylindrical wall of the release piston, which defines an interior space, slides against a cylindrical wall of the release housing between the rest position, in which the first axial side of the release piston abuts against a shoulder of the release housing, and the release position, in which the release piston abuts against an axial stop carried by the plug, the at least one retaining element being carried by the plug and, in the armed position, the at least one holding member extending into the release housing through the through bore of the plug so that the at least one holding member can be gripped by the at least one retaining element in the locking position, the at least one retaining element being configured to be located, in the locking position, on a path followed by the annular end of the release piston during a movement of the release piston from the rest position to the release position, so as to be moved from the locking position to the unlocking position by the annular end of the release piston pushing against the at least one retaining element.

5. The device according to claim 4, wherein the device comprises a plate which is located in an interior space defined by the cylindrical wall of the release piston, wherein the plate is fixed to the plug, and at a distance therefrom, by spacers, the plate having a first face facing the first axial side of the release piston and a second opposite face on a side of which the at least one retaining element is located, the axial stop being carried by the first face of the plate and the means for returning the release piston to the rest position being elastic return means bearing on the first face of the plate and pressing against the first axial side of the release piston.

6. The device according to claim 4, wherein the at least one retaining element is movable between the locking position and the unlocking position by pivoting.

7. The device according to claim 6, wherein the at least one retaining element includes two retaining elements each pivotally mounted about a respective pivot pin, said pivot pin is integral with the plug, each pivot pin is orthogonal to the longitudinal axis of the launch tube and is perpendicular to a longitudinal plane of the launch tube, the device further comprising means for elastically returning the retaining elements to the locking position.

8. The device according to claim 1, wherein the release housing is surrounded by the ejection spring, the at least one retaining element is connected to the release housing and is located in an interior space of the ejection spring, and the ejection element comprises a thrust head that is perpendicular to the longitudinal axis of the launch tube and the second end of the ejection spring bears against the thrust head, and at least one holding member that is integral with the thrust head and extends into the interior space of the ejection spring, the at least one retaining element being configured to hold the ejection assembly in the armed position by gripping the at least one holding member in the locking position.

9. The device according to claim 1, wherein the at least one retaining element is movable between the locking position and the unlocking position by pivoting.

10. A method for launching drones using a device as defined in claim 1, wherein the method comprises the following successive steps:
    a positioning step, comprising positioning a drone in the launch chamber, the ejection assembly being locked in the armed position;
    a step of launching the drone, comprising introducing into the release chamber sufficient gas pressure to move the release element from the rest position to the release position, whereby the ejection assembly is unlocked and ejects the drone from the launch tube; and before the positioning step is repeated, a repositioning step, comprising returning the ejection assembly to the armed position, in which the ejection assembly is locked by the at least one retaining element.

11. A tool for implementing the method as defined in claim 10 for launching drones using the device, wherein the tool comprises:

a carriage movable in translation along at least one frame, wherein the frame has, at one end, a drive plate, the carriage and the frame configured to be introduced into the launch chamber such that the carriage bears against the ejection element and the drive plate bears against the front end of the launch tube, and translation driving means being provided for driving the carriage in translation along the frame, the carriage is movable towards the rear end of the launch tube by means of said translation driving means so as to compress the ejection spring and return the ejection assembly to the armed position.

12. The tool according to claim 11, wherein the frame further comprises a bottom plate able to bear against the rear end of the launch tube, and at least one guide rod connecting the bottom plate and the drive plate, the carriage is mounted movable in translation along the at least one guide rod, the translation driving means comprise a worm screw and means for driving the worm screw in rotation, the worm screw extending between the bottom plate and the drive plate, the worm screw is connected to the bottom plate and to the drive plate so as to be rotatable about a longitudinal axis of the worm screw, and passing through a threaded hole in the carriage, whereby rotation of the worm screw results in translation of the carriage.

* * * * *